US007130393B2

(12) United States Patent
Hall, Jr. et al.

(10) Patent No.: US 7,130,393 B2
(45) Date of Patent: Oct. 31, 2006

(54) INTELLIGENT NETWORK AND METHOD FOR PROVIDING VOICE TELEPHONY OVER ATM AND CLOSED USER GROUPS

(75) Inventors: Thomas Glenn Hall, Jr., Richardson, TX (US); Steven R. Donovan, Plano, TX (US)

(73) Assignee: MCI, LLC, Basking Ridge, NJ (US)

( * ) Notice: Subject to any disclaimer, the term of this patent is extended or adjusted under 35 U.S.C. 154(b) by 541 days.

(21) Appl. No.: 09/767,476

(22) Filed: Jan. 22, 2001

(65) Prior Publication Data

US 2002/0061101 A1     May 23, 2002

Related U.S. Application Data

(60) Provisional application No. 60/176,928, filed on Jan. 20, 2000.

(51) Int. Cl.
H04M 3/42         (2006.01)
H04M 7/00         (2006.01)

(52) U.S. Cl. .............................. 379/90.01; 379/201.07; 379/201.08

(58) Field of Classification Search ............ 370/395.1, 370/395.2, 395.53; 379/221.08, 201.07, 379/201.08
See application file for complete search history.

(56) References Cited

U.S. PATENT DOCUMENTS

| 5,473,679 | A |   | 12/1995 | La Porta et al. |
|---|---|---|---|---|
| 5,485,578 | A |   | 1/1996 | Sweazey |
| 5,539,884 | A | * | 7/1996 | Robrock, II ................. 709/227 |
| 5,819,019 | A |   | 10/1998 | Nelson |
| 5,825,780 | A |   | 10/1998 | Christie |
| 5,889,782 | A |   | 3/1999 | Dendi |
| 5,896,371 | A |   | 4/1999 | Kobayashi et al. |
| 5,946,323 | A |   | 8/1999 | Eakins et al. |
| 5,987,520 | A | * | 11/1999 | Libby et al. ................. 709/238 |
| 5,991,892 | A |   | 11/1999 | Honda |
| 5,996,001 | A |   | 11/1999 | Quarles et al. |
| 6,009,099 | A |   | 12/1999 | Lewis et al. |
| 6,026,091 | A |   | 2/2000 | Christie et al. |
| 6,041,039 | A |   | 3/2000 | Kilkki et al. |
| 6,078,586 | A |   | 6/2000 | Dugan et al. |
| 6,081,524 | A | * | 6/2000 | Chase et al. ................. 370/389 |
| 6,081,525 | A |   | 6/2000 | Christie et al. |
| 6,115,380 | A |   | 9/2000 | Christie et al. |
| 6,134,673 | A |   | 10/2000 | Chrabaszcz |
| 6,141,322 | A |   | 10/2000 | Poretsky |
| 6,141,410 | A |   | 10/2000 | Ginzboorg |
| 6,144,671 | A |   | 11/2000 | Perinpanathan et al. |
| 6,151,324 | A |   | 11/2000 | Belser et al. |
| 6,154,445 | A |   | 11/2000 | Farris et al. |

(Continued)

*Primary Examiner*—Ahmad F. Matar
*Assistant Examiner*—Hector Agdeppa

(57) ABSTRACT

An illustrative intelligent network and method for providing voice telephony over ATM and closed user groups are provided that can provide significant advantages. A method for providing a closed user group service to authorize VToA calls includes determining the closed user group identifiers for a calling party, determining the closed user group identifiers for a called party, locating a common closed user group identifier that is common to the calling party and the called party, analyzing the privileges of the calling party in the common closed user group to determine if the calling party can make calls to other users of the common closed user group, and analyzing the privileges of the called party in the common closed user group to determine if the called party can receive calls from other users of the common closed user group. An illustrative intelligent network and data structure to provide closed user group services is also provided.

21 Claims, 6 Drawing Sheets

U.S. PATENT DOCUMENTS

| | | |
|---|---|---|
| 6,169,735 B1 * | 1/2001 | Allen et al. .................. 370/352 |
| 6,181,703 B1 | 1/2001 | Christie et al. |
| 6,185,219 B1 | 2/2001 | Christie |
| 6,185,288 B1 | 2/2001 | Wong |
| 6,195,332 B1 | 2/2001 | Tang |
| 6,195,714 B1 | 2/2001 | Li et al. |
| 6,222,823 B1 | 4/2001 | Smith et al. |
| 6,252,952 B1 * | 6/2001 | Kung et al. .............. 379/114.1 |
| 6,253,207 B1 | 6/2001 | Malek et al. |
| 6,262,992 B1 | 7/2001 | Nelson et al. |
| 6,282,191 B1 | 8/2001 | Cumberton et al. |
| 6,314,103 B1 | 11/2001 | Medhat et al. |
| 6,317,439 B1 | 11/2001 | Cardona et al. |
| 6,324,179 B1 | 11/2001 | Doshi et al. |
| 6,359,859 B1 | 3/2002 | Brolin et al. |
| 6,363,411 B1 | 3/2002 | Dugan et al. |
| 6,381,246 B1 | 4/2002 | Constantinof et al. |
| 6,396,840 B1 | 5/2002 | Rose et al. |
| 6,424,652 B1 | 7/2002 | Christie |
| 6,430,195 B1 | 8/2002 | Christie et al. |
| 6,463,062 B1 | 10/2002 | Buyukkoc et al. |
| 6,483,837 B1 | 11/2002 | Howell et al. |
| 6,490,273 B1 | 12/2002 | DeNap et al. |
| 6,516,350 B1 | 2/2003 | Lumelsky et al. |
| 6,535,483 B1 | 3/2003 | Christie et al. |
| 6,535,507 B1 | 3/2003 | Li et al. |
| 6,563,816 B1 | 5/2003 | Nodoushani et al. |
| 6,614,781 B1 | 9/2003 | Elliott et al. |
| 6,643,258 B1 | 11/2003 | Ise et al. |
| 6,661,882 B1 | 12/2003 | Muir et al. |
| 6,671,271 B1 | 12/2003 | Takemura et al. |
| 6,674,746 B1 | 1/2004 | Lamarque, III |
| 6,690,656 B1 | 2/2004 | Christie et al. |
| 6,704,327 B1 | 3/2004 | Gardner et al. |
| 6,721,284 B1 | 4/2004 | Mottishaw et al. |
| 6,731,627 B1 | 5/2004 | Gupta et al. |
| 6,751,222 B1 | 6/2004 | Noake et al. |
| 6,754,180 B1 | 6/2004 | Christie |
| 6,754,322 B1 | 6/2004 | Bushnell |
| 6,757,278 B1 | 6/2004 | Bi et al. |
| 6,757,285 B1 | 6/2004 | Lakhani et al. |
| 6,822,961 B1 | 11/2004 | Constantinof et al. |
| 6,888,833 B1 | 5/2005 | Howell |
| 6,931,010 B1 | 8/2005 | Gallant et al. |
| 2002/0024945 A1 | 2/2002 | Civanlar et al. |
| 2002/0093947 A1 | 7/2002 | Allen et al. |
| 2002/0099854 A1 | 7/2002 | Jorgensen |
| 2004/0081174 A1 | 4/2004 | Lakhani et al. |
| 2004/0179531 A1 | 9/2004 | Bi et al. |

* cited by examiner

INTELLIGENT NETWORK AND METHOD FOR PROVIDING VOICE TELEPHONY OVER ATM AND CLOSED USER GROUPS

CROSS-REFERENCE TO RELATED APPLICATIONS

Pursuant to 35 U.S.C. 119(e), this application claims the benefit of U.S. Provisional Patent Application No. 60/176,928 entitled FAST MSCP, filed Jan. 20, 2000, that named John K. Gallant, Steven R. Donovan, Terry A. Caterisano, Robert H. Barnhouse, David E. McDysan, Saib Jarrar, Thomas Glenn Hall, Jr., and Terry Robb as inventors, and which is hereby incorporated by reference for all purposes.

This application is related to U.S. Pat. No. 6,931,010, entitled Intelligent Network and Method for Providing Voice Telephony over ATM and Private Address Translation, and named John K. Gallant, Thomas Glenn Hall, Jr., and Steven R. Donovan as joint inventors; U.S. patent application Ser. No. 09/768,070, entitled Intelligent Network and Method for Providing Voice Telephony over ATM and Alias Addressing, and named John K. Gallant as inventor, U.S. patent application Ser. No. 09/768,068, entitled Intelligent Network and Method for Providing Voice Telephony over ATM, and named John K. Gallant, Thomas Glenn Hall, Jr., and Robert H. Barnhouse as joint inventors; U.S. patent application Ser. No. 09/768,069, entitled Intelligent Network and Method for Providing Voice Telephony over ATM and Point-to-Multipoint Connectivity, and named Thomas Glenn Hall, Jr. as inventor; and U.S. patent application Ser. No. 09/766,943, entitled Intelligent Policy Server System and Method for Bandwidth Control in an ATM Network, and named John K. Gallant, Thomas Glenn Hall, Jr. and Steven R. Donovan as joint inventors; all filed on Jan. 22, 2001, and all of which are hereby incorporated by reference for all purposes.

Further, this application discloses subject matter related to the subject matter disclosed in the following co-assigned U.S. patent applications, each of which is incorporated herein by reference: Method and Apparatus for Providing Reliable Communications in an Intelligent Network, filed Jan. 12, 2000, Ser. No.: 09/481,910, now U.S. Pat. No. 6,535,991, in the names of: John K. Gallant, Cathleen A. McMurry, Robert H. Barnhouse, Steven R. Donovan, and Terry A. Caterisano; Method and Apparatus for Providing Real-Time Call Processing Services in an Intelligent Network, filed Oct. 20, 1999, Ser. No.: 09/421,827, now U.S. Pat. No. 6,393,481, in the names of: Ajay P. Deo, Henry Wang, Sami Syed, and Wendy Wong; Intelligent Call Processing System for a Telecommunication Network (Next Generation Intelligent Network (NGIN), filed Oct. 19, 1999, Ser. No.: 09/420,666, now U.S. Pat. No. 6,363,411, in the names of: Ajay P. Deo, Alan Holmes, Andrew Dugan, Kenneth Fischer, Sami Syed, Terence A. Robb, and Wendy Wong; Method and Apparatus for Supporting ATM Services in an Intelligent Network, filed Oct. 19, 1999, Ser. No.: 09/420,657, now U.S. Pat. No. 6,788,649, in the names of: Andrew Dugan, David E. McDysan, and Sami Syed; and Method and Apparatus for Managing Resources in an Intelligent Network, filed Oct. 19, 1999, Ser. No.: 09/420,655, now U.S. Pat. No. 6,804,711, in the names of: Alan Holmes, Andrew Dugan, Kelvin Porter, and Terence A. Robb.

TECHNICAL FIELD OF THE INVENTION

This invention relates in general to the field of data networks, telecommunications and more particularly to an intelligent network and method for providing voice telephony over Asynchronous Transfer Mode ("ATM") and closed user groups.

BACKGROUND OF THE INVENTION

The need for both voice telephony services as well as data services is common. Traditionally, this may only be achieved through the use of separate services. For example, dedicated voice telephony services and dedicated data services are provided over separate and distinct networks. This is a significant disadvantage because of the high expense of maintaining and paying for such separate and distinct services, not to mention the inconvenience and inefficiency introduced because voice and data services are not integrated.

Packet-switched telecommunications networks may be based on any of a variety of technologies and protocols such as, for example, Asynchronous Transfer Mode ("ATM"), MultiProtocol Label Switching ("MPLS"), Internet Protocol ("IP"), Frame Relay ("FR"), and X.25. Packet-switched telecommunications networks have data packets, cells, frames or blocks (hereinafter "packets" or "cells") that are either of fixed length or variable length. Although originally designed to transmit data, as opposed to voice or voice encoded data, packet-switched telecommunications networks may be used for voice communications. Some of the packet-switched technologies that may be used for voice communications include, without limitation, Voice Telephony over ATM ("VToA"), Voice over Frame-Relay ("VoFR"), Voice over Digital Subscriber Line ("VoDSL"), and Voice over IP ("VoIP").

Focusing on VToA when compared to voice communications or voice telephony provided over traditional circuit-dedicated or circuit-switching telecommunications networks, the use of VToA, unfortunately, presents significant problems and disadvantages, especially in view of the fact that the needs of both data communications and voice communications must be met over the same network. For example, VToA does not provide advanced telephony services and features that are commonly found in traditional circuit-dedicated telecommunications networks. Similarly, advanced signaling, also commonly found in traditional circuit-dedicated telecommunications networks, is not available for VToA in the same manner that circuit-dedicated or circuit-switching telecommunications networks.

To setup and establish a Switched Virtual Circuit ("SVC") to support VToA between a calling party and a called party, various signaling or ATM messages are used within the ATM network. This may be achieved using ATM setup and connect messages. Once ATM signaling has established an SVC, a data connection is defined and data, such as voice encoded data, may be communicated. Voice encoded data may continue to be communicated until one end of the SVC issues a release message (or any similar message that causes a disconnection). At such time, the SVC is released and voice communications ceases. Examples of traditional ATM signaling used to setup and release point-to-point and point-to-multipoint SVCs for telephony applications is illustrated in the book entitled *Hands-On ATM* by David E. McDysan and Darren L. Spohn, which is incorporated herein for all purposes.

The administration and maintenance of VToA systems and processes is extremely burdensome and expensive. For example, numerous private and public phone numbers, which change frequently, have to be updated and maintained in various systems and gateways. As moves, adds, changes, and deletions occur, each VToA gateway must be updated with the relevant changes. This is a critical task that is onerous and expensive to perform and fraught with potential errors.

In a traditional telecommunications or voice network, signaling can be in-band or out-of-band. Signaling may be used to setup and establish voice circuits, to provide Intelligent Network ("IN") or Advanced Intelligent Network ("AIN") services and features, and to disconnect voice circuits. In an ATM network, where an SVC is established to support VToA, signaling is achieved through the use of ATM messages, such as those used to setup and disconnect SVCs. Unfortunately, such ATM signaling does not support IN or AIN to provide the advanced telephony services and features commonly found in traditional voice telecommunications networks. This significantly reduces the attractiveness of VToA as compared to traditional voice telecommunications networks or even some other data or packet networks capable of providing voice or telephony communications services.

More particularly, a serious problem and drawback of existing VToA systems and methods is the difficulty or inability to institute advanced calling features or policies on an ATM network-wide basis. Unfortunately, many customary and advanced voice telephony services, which are often available through traditional telecommunications networks designed to transport and support voice telephony, such as circuit-dedicated telecommunications networks, are not available or easily achieved or implemented with VToA. For example, the capability to easily and efficiently provide closed user groups is not available with VToA.

The closed user group service is a valuable service or feature of modern telecommunications systems, especially those used in business enterprises. Telecommunications specifications exist that provide the closed user group service. Unfortunately, these specifications rely on the availability of an interlock code, which is not defined in ATM.

An interlock code provides a mechanism in which only one of the closed user groups is designated for each call. Thus, under such a mechanism, closed user group policies can be enforced on each call using the one closed user group designated for the call. Although a user may be a member of numerous closed user groups, at any given moment, a user can only operate under one of the numerous closed user groups in which it is a member. Unfortunately, the capability to provide interlock code functionality does not exist in ATM. This greatly hampers any potential implementation of closed user groups in ATM.

Generally, closed user groups allow various users to be grouped so that calling privileges may be applied to groups. For example, various user groups of an enterprise might be defined to include the engineering, finance, and marketing groups of a business enterprise. Various combinations of these user groups may be combined to form a closed user group. Each such user group of a closed user group may have certain privileges established to control such things as the capability to originate a call to another user of the same closed user group, the capability to receive a call from another user of the same closed user group, the capability to originate a call to another outside of the closed user group, and the capability to receive a call from another outside of the closed user group. Unfortunately to implement such a service or feature in a traditional VToA would require that blocking information be provided in various systems and gateways and these would have to be frequently updated. This is impractical, inefficient, cumbersome and expensive to carry out. As is illustrated, this type of a service is problematic to implement in traditional VToA networks and systems.

SUMMARY OF THE INVENTION

From the foregoing it may be appreciated that a need has arisen for an intelligent network and method for providing VToA and closed user groups that provide intelligent network signaling to support advanced telephony services and features for VToA and closed user groups, while still allowing the benefits of integrating voice and data communications on the same ATM network. In accordance with the present invention, an intelligent network and method for providing VToA and closed user groups are provided that substantially eliminate one or more of the disadvantages and problems outlined above.

According to one aspect of the present invention, a method for providing a closed user group service to authorize VToA calls using an intelligent network and a switched virtual circuit over an ATM network is provided. The method includes determining the closed user group identifiers for a calling party, determining the closed user group identifiers for a called party, locating a common closed user group identifier that is common to the calling party and the called party, analyzing the privileges of the calling party in the common closed user group to determine if the calling party can make calls to other users of the common closed user group, and analyzing the privileges of the called party in the common closed user group to determine if the called party can receive calls from other users of the common closed user group. The VToA call between the calling party and the called party is completed if a common closed user group identifier is located, the calling party has privileges to call other users of the common closed user group, and the called party has privileges to receive calls from other users of the common closed user group.

According to another aspect of the present invention, a data structure on a storage media for defining closed user groups to authorize VToA calls using an intelligent network and a switched virtual circuit over an ATM network is provided. The data structure includes a plurality of users, wherein each of the plurality of users are defined by an ATM address, a plurality of user groups, wherein each of the plurality of user groups are defined by an association with a collection of the plurality of users, and wherein each user of the plurality of users may only be a member of one user group. The data structure further includes a plurality of privilege sets, wherein each of the plurality of privilege sets are defined by a privilege value that represents a plurality of privileges, and a plurality of closed user groups, wherein each of the plurality of closed user groups are defined by a closed user group identifier that is associated with a plurality of user group/privilege set combinations, wherein each of the plurality of user group/privilege set combinations are associated with a user group of the plurality of user groups and a privilege set of the plurality of privilege sets.

The present invention provides a profusion of technical advantages that include the capability to efficiently and effectively provide advanced telephony services and functions to VToA through an intelligent network. This can substantially increase overall VToA performance and make VToA much more attractive to customers looking to seamlessly and efficiently integrate both data and voice over the same ATM network to achieve substantial savings, but still retain advance telephony capabilities.

Another technical advantage of the present invention includes the capability to utilize an ATM network to provide advanced telephony functions, while efficiently using ATM bandwidth by setting up SVCs to handle phone calls and releasing this bandwidth when the phone call has ended. This results in efficient utilization of ATM bandwidth and may save capital costs by reducing the amount of bandwidth needed.

Yet another technical advantage of the present invention includes the capability to control ATM telephony or voice routing tables in a central location and in the intelligent network layer, as opposed to the prior technique, defined by the various ATM standards bodies, to control ATM telephony at the end points. This significantly reduces overall costs to operate a telecommunications network to support VToA, and significantly reduces the opportunity for erroneous information entering the network. This advantage is achieved by separating the ATM intelligence from the ATM switching.

Still yet another technical advantage of the present invention surrounds the capability to provide closed user groups with VToA without using an interlocking code. The implementation of closed user groups normally requires an interlocking code, which is not provided in ATM. This significantly enhances the advanced telephony features available with VToA.

Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
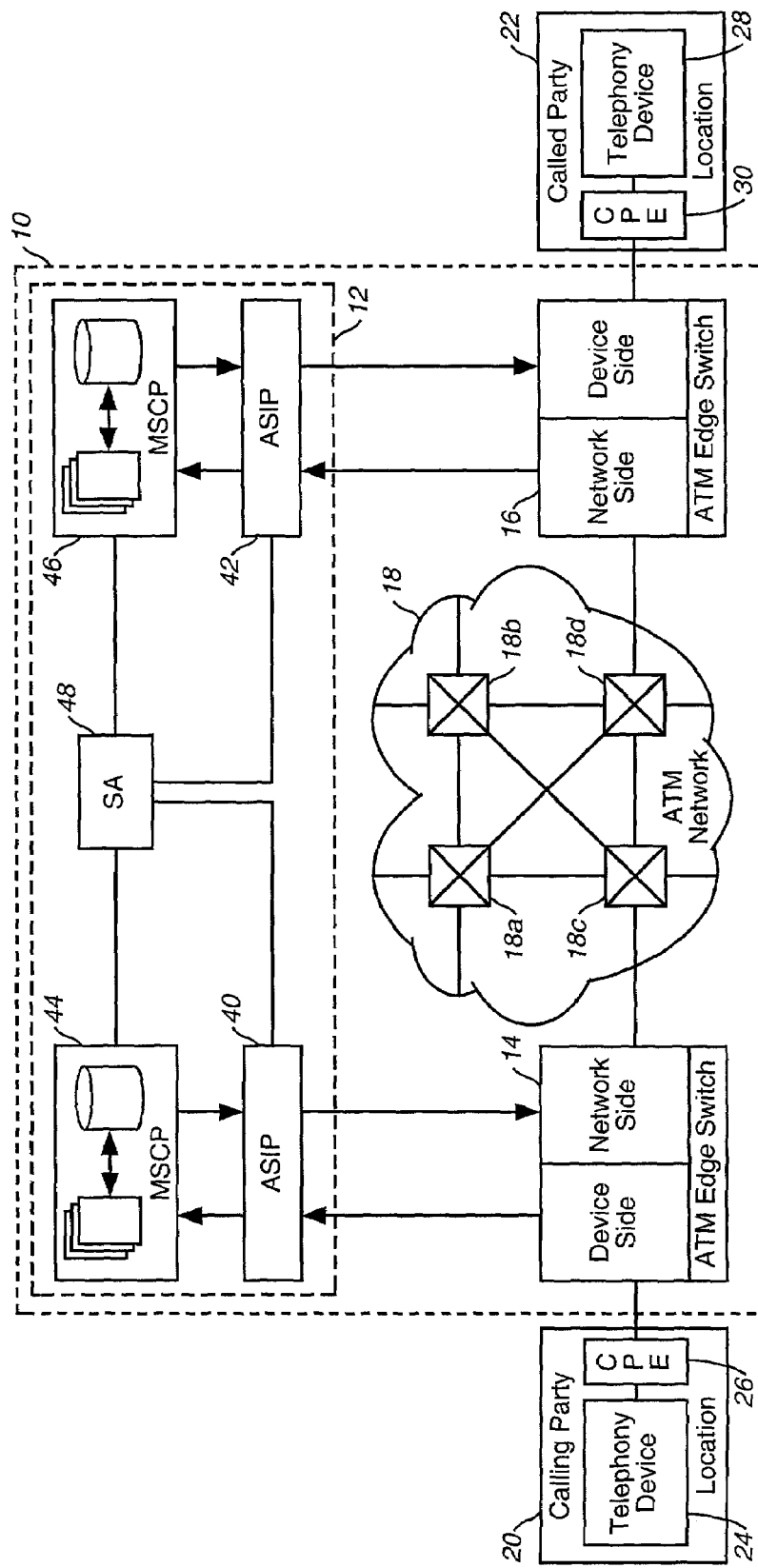
FIG. 1 is a diagram that illustrates a telecommunications network for providing VToA services, such as closed user group services, using an ATM switched virtual circuit according to an embodiment of the present invention.

FIG. 1 is a diagram that illustrates a telecommunications network 10, which also may be referred to as an intelligent ATM network or as a Smart Bandwidth on Command ("SBoC") network, for providing Voice Telephony over ATM ("VToA") services, such as closed user group services, using an ATM Switched Virtual Circuit ("SVC") according to an embodiment of the present invention. The description below in connection with FIGS. 1–4 provides a discussion of the operation of the telecommunications network 10 so that the closed user group aspect of the present invention may be described more fully in connection with the description accompanying the FIGS. 5, 6, 7 and 8.

The telecommunications network 10 includes an intelligent network 12, which also may be referred to as an intelligent network layer, in communication with an ATM edge switch 14 and an ATM edge switch 16 of an ATM network 18. A calling party location 20 is illustrated in communication with the ATM edge switch 14, and a called party location 22 is shown in communication with the ATM edge switch 16.

The intelligent network 12 is operable to intercept and process ATM signaling messages provided to the ATM edge switch 14 and the ATM edge switch 16. This architecture allows the intelligent network 12 to provide various telephony features and services, including advanced telephony features and services, to VToA provided over an ATM network, such as the ATM network 18, through an SVC.

It should be noted that the ATM edge switch 14 and the ATM edge switch 16 may be considered to be part of the ATM network 18. Of course, the ATM network 18 may include any of a variety of ATM switches and/or ATM network elements or devices and may geographically span or cover virtually any region. The ATM switches of the ATM network 18, including the ATM edge switch 14 and the ATM edge switch 16, may be provided by any of a number of ATM switch manufacturers, such as, for example, NEWBRIDGE and ALCATEL. Of course, multiple connections can be provided to the ATM network 18 through any of a variety of edge switches, such as at the ATM edge switch 14. In order to simplify the illustration of the present invention, including the illustration of setting up a VToA call originating from a calling party, only two connections to the ATM network 18 are illustrated in FIG. 1 and include the calling party location 20 and the called party location 22.

The calling party location 20 and the called party location 22 may include any of a variety of end-user devices and Customer Premises Equipment ("CPE"). For example, the calling party location 20, which could be referred to as an ingress location since this is the calling location, includes a telephony device 24 and a CPE 26. Similarly, the called party location 22 is illustrated with a telephony device 28 and a CPE 30.

Of course, any of a number of arrangements may be provided at the calling party location 20 and the called party location 22. In one embodiment, these locations may also include Data Communications Equipment ("DCE") to support traditional ATM data communications. As is apparent, the capability to communicate both data and voice over the same ATM network provides significant advantages and conveniences that normally result in substantial savings. This arrangement in combination with the present invention allows both VToA calls, with intelligent network features and services provided or controlled by the intelligent network 12, and ATM data transfers to be supported using the same ATM network, such as the ATM network 18. For example, a business enterprise that has multiple locations may significantly benefit by providing voice communications, with intelligent networking features, using VToA and data communications all through the same ATM network.

In one embodiment, the telephony device 24 and the telephony device 28 may be provided as a telephone, a personal computer, a computer network, answering machine, video conferencing equipment, or any of a variety of other devices operable to support or provide telephony functionality. The CPE 26 and the CPE 30 may be implemented using any of a number of devices. For example, and without limitation, the CPE 26 and the CPE 30 may be implemented as a router, a PBX with ATM signaling capability, an enterprise gateway, or a network gateway. The CPE 26 and the CPE 30 may be implemented, in one embodiment, using a CPE device provided by ACCELERATED NETWORKS.

The communications link between the ATM edge switch and the calling party or called party location may be provided using any number of available links, such as dedicated links or leased lines. According to an aspect of the present invention, whenever a customer location desires to set up or establish an SVC to support VToA, a signaling ATM message, such as an ATM setup message, is provided from the customer location to the associated ATM edge switch of the ATM network 18. For example, if the calling party location 20 desires to establish an SVC through the ATM network 18, an ATM setup message may be sent from the calling party location 20 to the ATM edge switch 14. This ATM setup message may be used to designate that this SVC is being setup or established to provide VToA. In one embodiment, an ATM setup message is sent from the calling party location 20 to the ATM edge switch 14 using a predefined or predetermined protocol such that a designated value, which may be referred to as a VToA designator, is included in the content or payload of the ATM setup message to indicate that this SVC is being set up or established to support VToA.

In one embodiment, the telephony device 24 is provided as a telephone or personal computer with telephony software, and the CPE 26 is provided as an enterprise gateway that is provisioned with a special ATM address to identify the CPE 26 as an ATM device. An ATM setup message may be generated by a calling party by using the telephony device 24 to enter a phone number, which may be referred to as a called party phone number value. The CPE 26 generates the ATM setup message, which may be referred to as an input ATM setup message, in response to initiate an SVC for VToA by saving various values in the content of the ATM setup message.

The content may be stored in an ATM setup message using various designated areas, which may be referred to as fields, addresses or parameters. The content that is stored in each such parameter may be referred to as a value. An example of some of the parameters that may be present in an ATM setup message is provided in the following table:

| ATM SETUP MESSAGE PARAMETERS |
| --- |
| Called Party Number |
| Called Party Subaddress |
| Calling Party Number |
| Calling Party Subaddress |

In a preferred embodiment of the present invention, the ATM address of the CPE 26, which may be referred to as the ATM address of the calling party CPE, is stored in the ATM setup message as the calling party number parameter, the telephone number associated with the telephony device 24, which may be referred to as the calling party phone number value, is stored in the ATM setup message as the calling party subaddress parameter, a special or designated number or address, which may be referred to as the VToA designator, is stored in the called party number of the ATM setup message, and the dialed or called telephone number, which may be referred to as the called party phone number value, is stored in the called party subaddress of the ATM setup message.

This input ATM setup message is then provided to the ATM network 18 at the ATM edge switch 14. In essence, this ATM setup message instructs the ATM network 18 to setup an SVC between the ATM address of the CPE 26 and the special or designated ATM address that is provided as the called party number of the ATM setup message. This special or designated ATM address or number may also be referred to as a VToA designator. This is a predetermined or predefined number which will be used by the intelligent network 12 to indicate that this setup message request for an SVC is to provide VToA and hence the advance telephony services or features of the present invention should be applied by the intelligent network 12.

The input ATM setup message is received at the ATM edge switch 14. The ATM edge switch 14, just like the ATM edge switch 16, may be thought of as divided into two portions, a device side portion and a network side portion. The device side is the side where a customer or client interfaces, generally through a CPE, with the ATM network 18. Signaling messages received at the device side of the ATM switch 14 from the CPE 26 are intercepted by the intelligent network 12. The intelligent network 12, which will be described more fully below in connection with FIG. 1 and FIGS. 3 and 4, receives the input ATM setup message generated by the CPE 26 and analyzes its contents. From this analysis, the presence of the VToA designator, which in one embodiment may be stored in the called party number parameter of the ATM setup message, indicates that this input ATM setup message is a request to setup an SVC for VToA.

Once it is determined that the signaling message is a request to setup or establish an SVC for VToA, the intelligent network 12 will, preferably, perform as much processing as possible on the ATM setup message at the ingress ATM edge switch. Before discussing some of the various intelligent network services or features that may be provided by the present invention, the processing of the input ATM setup message is discussed. In one embodiment, the intelligent network 12 locates the called party phone number value and performs a table search or "look-up" to determine a corresponding ATM address, such as the ATM address for a destination CPE or device, such as a termination gateway, an enterprise gateway or a network gateway. This ATM address may be referred to as the ATM address of the called party CPE. In a preferred embodiment, the called party phone number value is retrieved from the called party subaddress parameter to perform the necessary functions to find the associated destination ATM address. Once located, this destination ATM address may be provided so that a modified or output ATM setup message may be generated to establish an SVC to support VToA from the CPE 26 to the destination ATM device. In a preferred embodiment, the calling party phone number value is stored in the calling party subaddress parameter of the input ATM setup message, and the ATM address of the calling party CPE or device is stored in the calling party number parameter of the input ATM setup message.

When a VToA call originates from the calling party location 20 and terminates at the called party location 22, the ATM edge switch 14 may be referred to as the ingress ATM switch while the ATM edge switch 16 may be referred to as the egress ATM edge switch. Generally, each such ATM edge switch may function as either an ingress or an egress ATM edge switch.

The output ATM setup message is transmitted from the intelligent network 12 to the network side of the ATM edge switch 14 where it is sent to the ATM network 18. The output ATM setup message is transmitted through the ATM network until it arrives at the network side of the ATM edge switch 16. The intelligent network 12 intercepts and processes this ATM message and, generally, will provide the ATM message back to the device side of the ATM edge switch 16 at the appropriate port so that it will be communicated to the CPE 30 of the called party location 22. If the intelligent network 12 modifies or changes the output ATM setup message, the resulting ATM message may be referred to as a destination or gateway ATM setup message.

A preferred embodiment of an implementation of the intelligent network 12 is provided next. The intelligent network 12, as shown in FIG. 1, includes an ATM signaling intercept processor ("ASIP") 40, which is associated with the ATM edge switch 14 that is shown serving as an ingress ATM edge switch, an ASIP 42, which is associated with the ATM edge switch 16 that is shown serving as an egress switch, a multi-service control point ("MSCP") 44 in communication with the ASIP 40, an MSCP 46 in communication with the ASIP 42, and a service administration 48. The service administration 48, in the embodiment shown in FIG. 1, is operable to provision the ASIP 40, the MSCP 44, the ASIP 42, and the MSCP 46. In provisioning these elements of the intelligent network 12, the service administration 48 will, preferably, provide user interfaces to each such element. In a preferred embodiment, the service administration 48 also maintains a database of record, which may be the same as or similar to the database shown in the MSCP 44 and the MSCP 46.

The ASIP 40 and the ASIP 42 will generally be associated with a designated ATM edge switch, such as the ATM edge switch 14 and the ATM edge switch 16. The MSCPs, such as the MSCP 44 and the MSCP 46, may interface or work in conjunction with one or more ASIPs. In an alternative embodiment, one MSCP interfaces and works with all ASIPs of the intelligent network 12. All of the MSCPs of the intelligent network 12 may provide the same or essentially the same functionality.

The ASIP 40 and the ASIP 42, generally, function to intercept ATM signaling messages, such as an ATM setup message, an ATM connect message, and an ATM release message. The ASIP 40 and the ASIP 42 intercept and process ATM signaling messages from the associated switch whether the signaling messages are provided from the device side or from the network side of the associated ATM edge switch. It should be noted that the ASIP 40 and the ASIP 42 are both capable of or operable to receive signaling messages provided through their associated ATM edge switch in either direction. For example, although the call setup illustrated in FIG. 1 illustrates a VToA call that originates at the calling party location 20 and terminates at the called party location 22, the ASIP 40 and the ASIP 42 perform their functions when the ATM signaling messages are traveling in the opposite direction, such as if the called party location 22 originates a VToA call through an SVC to the calling party location 20. Once the ATM signaling message, such as the input ATM setup message, is intercepted, an input is generated by the ASIP and the input is provided to the associated MSCP, such as the MSCP 44 and the MSCP 46.

The MSCP 44 and the MSCP 46 both contain various applications that can provide intelligent network and even advanced intelligent network VToA services and features. The applications will preferably be provided as software applications that provide the desired logic and algorithms to achieve the desired intelligent network service or feature. In performing these various services and features, the MSCPs must access various information that may include, for example, ATM addresses, associated telephone numbers, customer profiles, user profiles, and any of a variety of other needed information to support or provide the desired service and feature.

As a result of the processing performed by the MSCP 44 and the MSCP 46, an output is generated. The output is then provided back down, as represented by the arrows extending from the MSCPs to their associated ASIPs, so that the ASIP 40 and the ASIP 42 may assemble the output to generate a resulting ATM message. The ASIP, in a preferred embodiment, also provides call modeling functionality that allows multiple calls to be modeled.

To illustrate the operation of the intelligent network 12 to provide intelligent network functionality to the telecommunications network 10 and the ATM network 18, the establishment of an SVC for VToA is illustrated next. Assuming that the calling party location 20 initiates the establishment or setup of an ATM SVC for VToA with the telephony device 28 of the called party location 22, the CPE 26 of the calling party location 20 responds to the request by the telephony device 24 to setup a phone call. The CPE 26 generates an input ATM setup message and provides this input ATM setup message to the ATM edge switch 14. The ATM edge switch 14 may be thought of as having a device side portion and a network side portion, just like the ATM edge switch 16. The input ATM setup message is received at the device side of the ATM edge switch 14 and is intercepted by the ASIP 40.

The ASIP 40 processes the input ATM setup message and, using one or more of the various values that may be stored within or in association with the input ATM setup message, generates an input. The input is then communicated or provided to the MSCP 44. The MSCP 44 may provide any number of telephony services and features. The MSCP 44, however, must analyze the input to determine if the input ATM setup message is a request for an SVC for VToA. In a preferred embodiment, a predefined or predetermined value is stored within the called party number parameter of the input ATM setup message. The value provided within this called party number parameter of the input ATM setup message is analyzed to determine if the input ATM setup message is requesting an SVC for VToA. In one embodiment, the value stored within the called party number parameter of the input ATM setup message may be referred to as a VToA designator, i.e., designating that the input ATM setup message is a request for an SVC for VToA. It should be understood, however, that any of a variety of ATM setup messages parameters may be used to provide this functionality. The CPE 26, which originally generated the input ATM setup message, will store the appropriate VToA designator value within the appropriate parameter, such as the called party number parameter, when generating the input ATM setup message so that the appropriate MSCP associated with the ingress ATM edge switch will recognize the input ATM setup message as one requesting an SVC for VToA.

If the VToA designator is not found, the MSCP 44 will provide an output to the ASIP 40 and the ATM setup message will continue as if a request is being made to establish or setup an SVC for a data transfer. If the VToA designator is found, additional service and feature processing may proceed. In order for the SVC for VToA to be established, a called party phone number value, which will be included as part of the input from the ASIP 40, will need to correlated by the MSCP 44 with a corresponding value that is equal to the ATM address of the called party CPE, which is in this case is the CPE 30. If the called party phone number value is not found, the call may fail or be rejected. The ATM address of the called party CPE and the called party phone number value, along with any other values generated as a result of the processing that may have occurred through any of a variety of services and features that may be provided by the MSCP 44, results in the MSCP 44 generating an output. The output is received and used by the ASIP 40 to generate or assemble an output ATM setup message.

The output ATM setup message may then be provided to the network side of the ATM edge switch 14 where it is then routed through the ATM network 18 using traditional or available ATM protocols until the output ATM setup message is received at the network side of the ATM edge switch 16. Of course, the ATM network 18 may include any of a variety or any number of ATM switches, such as the ATM switches 18a, 18b, 18c, and 18d. It should also be noted that any number of additional ATM edge switches may be connected to the ATM network 18 through virtually any available ATM switch or ATM network element.

The output ATM setup message is received at the network side of the ATM edge switch 16 where the ASIP 42 intercepts the signaling message and generates an input. The input is provided from the ASIP 42 to the MSCP 46. The MSCP 46, similar to the MSCP 44, analyzes the input to determine what, if any, processing is needed. In this case, the MSCP 46 finds the ATM address of the called party CPE, which in this case is the CPE 30, in the input and provides appropriate routing information and generates a corresponding output of the MSCP 46. Of course, various other processing may also occur, depending on the particular feature or service.

The ASIP 42 receives the output from the MSCP 46 and generates or assembles another setup message. In one embodiment, the resulting ATM setup message may be referred to as a destination or gateway ATM setup message since it will ultimately be provided to the CPE 30, which may be implemented as an enterprise gateway, a network gateway or any of a variety of telephony access devices. If the output ATM setup message is not changed by the output from the MSCP 46, the resulting ATM setup message may still be referred to as the output ATM setup message and it is provided to the device side of the ATM edge switch 16, just like any destination or gateway setup message, where it is then provided to the CPE 30.

At the CPE 30, the appropriate telephony device, in this case telephony device 28, is contacted so that a call may be established or setup. In response, the CPE 30 may generate an ATM connection message or any other ATM signaling message which is available and would be known of ordinary skill in the art. For example an ATM connection message and an ATM release message may be generated during this VToA call.

Figure 2:
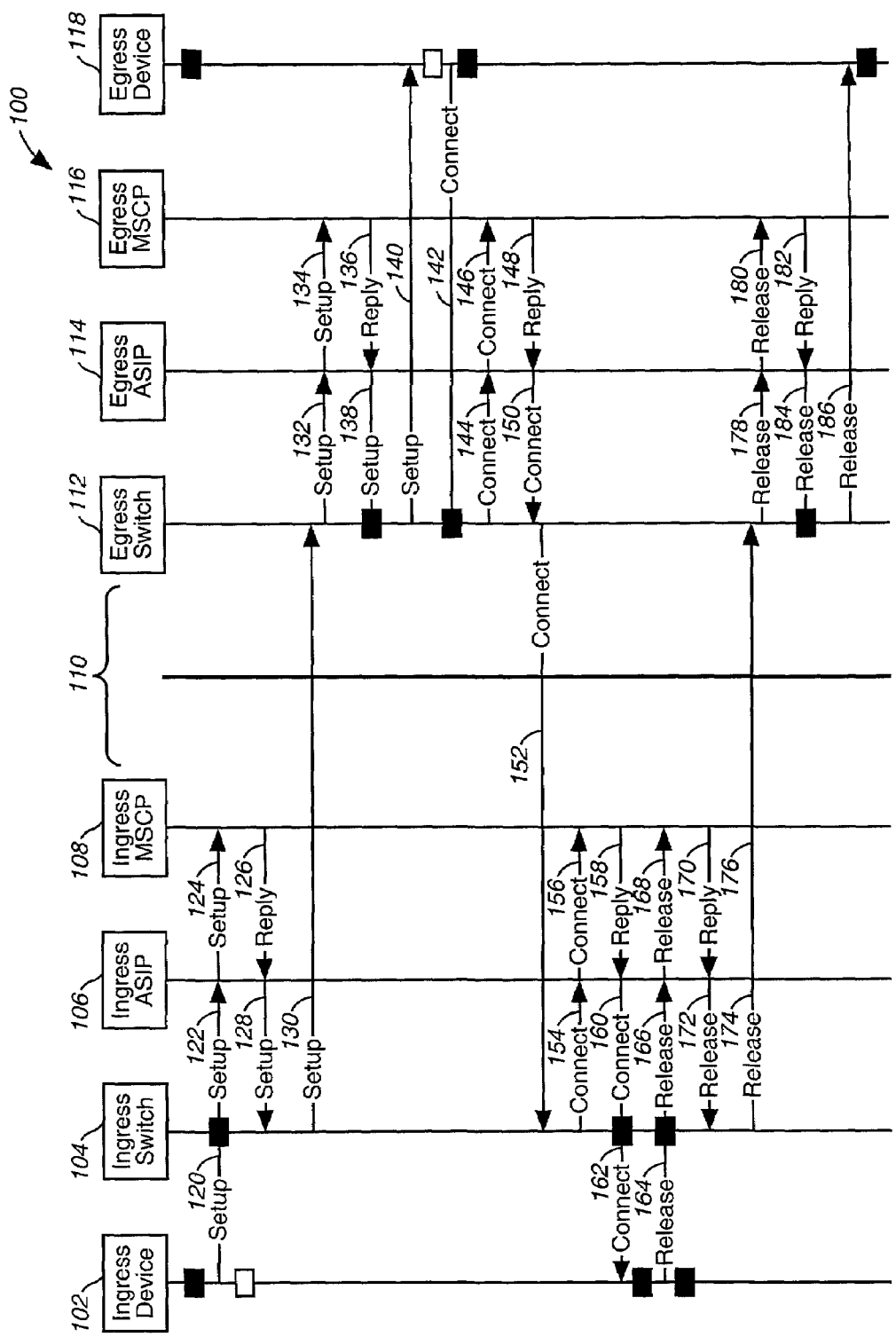
FIG. 2 is a line diagram that illustrates the signaling and call flow performed by the intelligent network for a VToA call, including the setup, connect, and release portions, according to an embodiment of the present invention.

FIG. 2 is a line diagram 100 that illustrates the signaling and call flow performed by the intelligent network for a VToA call, including the setup, connect, and release portions of the VToA call, according to an embodiment of the present invention. The VToA call is achieved through the use of an ingress device 102, an ingress ATM edge switch 104, an ingress ASIP 106, and ingress MSCP 108, an ATM network 110, an egress ATM edge switch 112, an egress ASIP 114, an egress MSCP 116, and an egress device 118. Starting in the upper lefthand portion of FIG. 2, an input ATM setup message is generated and provided from the ingress device 102 to the ingress ATM edge switch 104.

The ingress device 102 may be any of a variety of devices such as the CPE 26 of FIG. 1, a router, a PBX, a telephony access device, or a gateway, such as an enterprise gateway or a network gateway to provide access to the Public Switched Telephone Network ("PSTN"). Generally, the ingress device 102 must simply have the capability to generate an input ATM setup message that includes a VToA designator stored in the called party number parameter of the input ATM setup message (or other location or parameter depending on the intelligent network design), and a called party phone number value stored in the called party subaddress parameter of the input ATM setup message. In other embodiments, the input ATM setup message may also contain the value of the ATM address of the calling party CPE and the calling party phone number value. In such a case, these values are preferably stored in the calling party number parameter and the calling party subaddress parameter, respectively, of the input ATM setup message. Line 120 represents the communication of the input ATM setup message from the ingress device 102 to the ingress ATM edge switch 104.

It should be noted that the line diagram 100 illustrates only the basic signaling and call flow of a VToA call. Other signals or messages, which would be understood by one of ordinary skill in the art and normally provided automatically as part of one or more ATM specifications, may include various acknowledgment signals or messages, such as connect acknowledge, a call proceeding message, and a release complete message.

The ingress ATM edge switch 104 receives the input ATM setup message and communicates it to the ingress ASIP 106 as represented by a line 122. The ingress ASIP 106 provides various values and addresses contained within various parameters of the input ATM setup message and provides those values to the ingress MSCP 108 as shown in a line 124. For example, the ingress ASIP 106 may provide the VToA designator, which may be stored in the called party number parameter of the input ATM setup message, and the called party phone number value, which may be stored in the called party subaddress parameter of the input ATM setup message, to the ingress MSCP 108. The VToA designator is used in the present invention to indicate that a setup message is requesting to set up an SVC for VToA.

After the ingress MSCP 108 confirms, by analyzing the value of the VToA designator, that an SVC for VToA is requested, the ingress MSCP 108 may perform any of a variety of advanced telephony functions to provide VToA services and features as desired or requested. If a VToA designator is not found by the MSCP 108 during setup, an ATM data call may be assumed. The ingress MSCP 108 may provide any of a variety of advanced telephony functions to provide VToA services and features. Example of some of these services and features include Default Calling Party Number Handling ("DCH"), Source Address Validation ("SAV"), Customer Port Maximum Call Attempt Rate Limit ("CMR"), Closed User Group ("CUG"), Destination Address Screening ("DAS"), Source Address Screening ("SAS"), Customer Port Maximum Burst Size Limit ("CMBS"), Customer Port Aggregate Bandwidth Limit ("CBW"), Customer Port Maximum Concurrent Calls in Progress Limit ("CMC"), Private Address Translation ("PAT"), Customer Port Service Class Selection ("CSCS"), and Point-to-Multipoint, Root-Initiated Connections ("P2MR"). Preferably, most of the intelligent network features and processing are performed at the ingress MSCP 108. In some cases, such as, for example, PAT, additional intelligent networking service or feature processing must be performed at other locations, such as the egress MSCP 116.

A brief summary of the calling services and features mentioned above is provided. DCH provides logic to handle input ATM setup messages in which a calling party phone number value is not provided. In such a case, the DCH feature may substitute a default calling party phone number value. SAV determines whether a user is requesting a call through an authorized or proper port. VToA privileges may be given on a per port basis, and the SAV feature may insure that only authorized users are allowed to access the ATM network through particular network ports, such as a physical port or a Customer Logic Port ("CLP"). CMR may be used to verify that the number of access attempts at a CLP does not exceed a provisioned or predetermined rate.

The CUG feature allows various users of an enterprise or customer to be partitioned into defined user groups. This allows various policies or privileges to be enforced on a group basis. A basic feature of CUG is to provide the capability to restrict calls to other users outside of the CUG or within certain other closed user groups. The DAS and SAS services or features provide call-screening lists that allow either the originating party or the terminating party to define the addresses to which calls can be made or from which calls can be received, respectively. In one embodiment, two types of call-screening lists may be supported for each user or subscriber that include a group list and a user list. This allows these services or features to be provided either on a group basis, an individual user basis, or both. The CMBS and CBW services or features provide a mechanism in which burst-size and bandwidth requests may be limited. This may prevent a few users from allocating large amounts of bandwidth and ATM network capability at the expense of other users. Similarly, the CMC feature limits the number of connections through a particular port.

The PAT service provides the significant advantage of allowing a customer to keep its own ATM numbering or addressing scheme. PAT is an example of a feature that requires ATM intelligent network processing, according to an embodiment of the present invention, at both the ingress ATM edge switch and the egress ATM edge switch. The CSCS feature provides a mechanism to configure the service classes available for a particular customer, which may be set up through an individual CLP. As an example, CSCS may support the capability to configure various classes of service such as Continuous Bit Rate ("CBR"), Variable Bit Rate, Non-Real Time ("VBR-NRT"), Variable Bit Rate, Real Time ("VBR-RT"), Unspecified Bit Rate ("UBR"), and Available Bit Rate ("ABR"). The P2MR feature or service allows for point-to-multipoint VToA to be provided using an SVC. These types of connections are unidirectional and, just as with point-to-point connections, can support virtually any type of content such as voice or video.

Referring back to FIG. 2, the ingress MSCP 108 will provide any of a number of various features, such as those just described, by performing any of a number of database or table queries and executing any of a number of applications or algorithms. As a result, the ingress MSCP 108 provides an output back to the ingress ASIP 106 as represented by the line 126. This output will be used by the ingress ASIP 106 to generate an output ATM setup message. The output will normally include an ATM address of the called party CPE. The CPE may be implemented as, for example, an enterprise gateway, a network gateway, or virtually any other telephony access device. The ingress ASIP 106 assembles or generates the output ATM setup message and provides this message to the ingress ATM edge switch 104 as represented by a line 128 of FIG. 2.

The output ATM setup message then passes through the ATM network 110 until it reaches the egress ATM edge switch 112. This is represented by a line 130. Similar to how the input ATM setup message was processed by the ingress devices, the egress devices process the output ATM setup message. Initially, the output ATM setup message is intercepted by the egress ASIP 114 once it reaches the egress ATM edge switch 112. This is represented by a line 132.

The egress ASIP 114 transfers various input values from the output ATM setup message to the egress MSCP 116. The egress MSCP 116 may provide various processing, but as mentioned above, most of the intelligent network service or feature processing will, preferably, be performed at the ingress side. The egress MSCP, in one embodiment, receives the ATM address of called party CPE and determines which port of the egress ATM edge switch 112 the setup message should be provided so that it may be communicated to the egress device 118. The egress MSCP 116, depending on the processing performed, may modify the input provided from the egress ASIP 114 and generate an output that is provided back to the egress ASIP 114, which is represented by a line 136 in FIG. 2.

The egress MSCP 116 may provide various applications, logic, and the like to carry out any of a variety of advanced intelligent network features. The egress MSCP 116 may contain various data provided in tables or databases, or have the capability to access data external to the egress MSCP 116. It should also be noted that the features or services provided by the egress MSCP 116 and the ingress MSCP 108 may be achieved by the same MSCP. The ASIPs, however, will generally be associated or dedicated to each ATM edge switch that the ASIP serves. It should also be noted that although the egress MSCP 116 is shown in FIG. 2 serving as an egress device 118, whenever the egress device 118 originates an SVC for VToA over the ATM network 110, the egress MSCP 116 will generally function as just described for the ingress MSCP 108.

The egress device 118, just as with the ingress device 102 described above, may be virtually any available CPE device such as, for example, an enterprise gateway, a network gateway, or a telephony access device. If the egress device 118 is an enterprise gateway, the egress MSCP 116 will generally not modify the input provided to it from the egress ASIP 114 and thus the egress ASIP 114 will receive an output from the egress MSCP 116 that is the same or similar as the input. In such a case, the output ATM setup message is provided to the egress ATM edge switch 112 where it is then provided to the egress device 118 to establish an SVC for VToA. This is represented by lines 138 and 140.

If the egress device 118 is a network gateway, or some similar device, the egress MSCP 116 may perform database operations to properly route the setup message to the egress device 118. In such a case, the egress MSCP 116 generates appropriate output and provides this output to the egress ASIP 114, as represented by the line 136. The egress ASIP 114 then assembles or generates another ATM setup message, which may be referred to as a destination or gateway ATM setup message, and provides this setup message to the egress ATM edge switch 112, which then provides such message to the egress device 118. This is represented by lines 138 and 140.

Once a party answers a telephony device, the egress device 118 generates an ATM connect message. This connect message is illustrated in FIG. 2 by lines 142–162. The ATM connect message propagates through the ATM network 110 until a connection is made between the ingress device 102 and the egress device 118. The ATM connection message is processed, similar to the ATM setup message, such that the ingress and egress ASIPs and MSCPs intercept and analyze each such signaling messages. At this point, an SVC has been established between the ingress device 102 and the egress device 118 through the ATM network 110 to provide VToA with intelligent network services and features. The MSCP and the ASIP may also provide call modeling to track various calls.

Once a party desires to end the call, which can come from either the ingress device 102 or the egress device 118, an ATM release message is generated. In FIG. 2, this ATM release message is generated by the ingress device 102. This proceeds similar to the connect and setup messages and is illustrated in FIG. 2 by the lines 164–186. This ends the VToA call.

Figure 3:
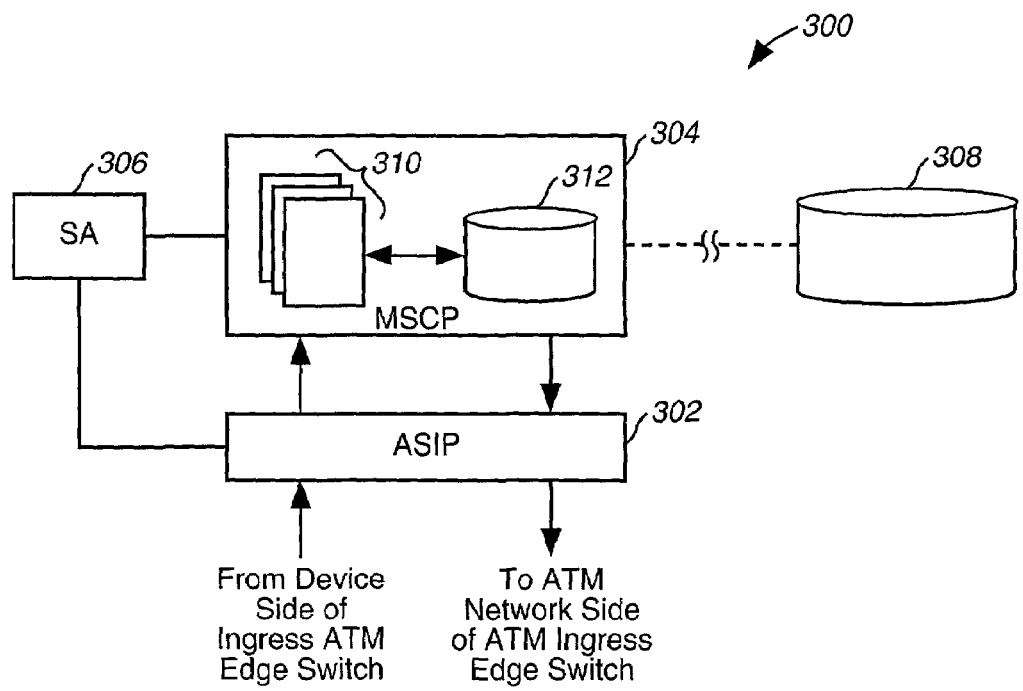
FIG. 3 is a block diagram that illustrates an intelligent network used at the ingress side of an ATM network for providing VToA services using an ATM switched virtual circuit.

FIG. 3 is a block diagram that illustrates an intelligent network 300 used at the ingress side of an ATM network for providing VToA services using an ATM switched virtual circuit. The intelligent network 300 includes an ASIP 302, an MSCP 304, and a service administration 306. A remote, external database 308 is also shown in FIG. 3 with a communications link with the MSCP 304. The database 308 is provided to illustrate the fact that the MSCP 304 may rely on external databases or tables. The service administration 306 may also contain various tables or databases that the MSCP 304 accesses or that is provided to the MSCP 304 as a database of record.

The ASIP 302 interfaces with an ATM edge switch, not shown in FIG. 3, and is capable of intercepting and receiving ATM message signals, such as ATM setup, connect, and release messages. When the ATM edge switch serves as the ingress ATM edge switch, the ASIP 302 receives ATM signaling messages from the device side of the ingress ATM edge switch. To establish an SVC to provide VToA, the ingress ATM edge switch provides an input ATM setup message from its device side to the ASIP 302. In addition to the functions described next, the ASIP 302 may also provide call modeling functionality. The ASIP 302 receives the input ATM setup message and, in one embodiment, extracts various information, such as the called party phone number value and the VToA designator, and communicates this information to the MSCP 304 as an input. The communications link between the MSCP 304 and the ASIP 302 may be a local connection or it may be a remote or long distance link. In one embodiment, the called party phone number value is stored in the called party subaddress parameter of the input ATM setup message and the VToA designator is stored in the called party number parameter of the input ATM setup message.

The MSCP 304, which also may be referred to as a policy server, includes various applications 310 and a database 312. The applications 310 may include any of a variety of software programs, logic, and algorithms that serve to provide VToA services and features. The database 312 may include any of a variety of tables and information useful to provide VToA services and features.

The service administration 306 is capable of provisioning the MSCP 304, and in some embodiments, the ASIP 302. The service administration 306 may control or synchronize multiple MSCPs to ensure that data or information in various MSCPs of the ATM network are coordinated and consistent.

The MSCP 304 receives the input from the ASIP 302 and can provide any number of VToA services and features. In order to establish an SVC for VToA, the MSCP 304 must determine if the input, provided by the ASIP 302 from the input ATM setup message, is a request to establish an SVC for VToA. If not, processing of an ATM data call proceeds. The MSCP 304, in a preferred embodiment, determines that the input ATM setup message is requesting an SVC to establish VToA by looking for the presence of the VToA designator. If present, the MSCP 304 uses the database 312 to determine the ATM address of the called party CPE using the called party phone number value provided as an input from the ASIP 302. The MSCP 304 may provide any of a variety of additional services and features, such as those described above in connection with FIG. 2, and will, generally, use the applications 310 and the database 312 to achieve these services and features. The MSCP 304 generates an output in response to the processing just described and communicates this output to the ASIP 302. If a VToA is to be set up, the output will generally include at least the called party phone number value and the ATM address of the called party CPE.

To illustrate some of the processing that may be performed by the MSCP 304 on the input provided by the ASIP 302, the following examples are provided. Assuming that an ATM address of the calling party CPE is provided as part of the input ATM setup message, and preferably as the calling party number parameter, the ASIP 302 may provide this as an input to MSCP 304. The value of this address is then used to determine what services or features are available for this particular address. The MSCP 304 may also, by examining the value of the called party phone number value provided in the called party subaddress parameter of the input ATM setup message, determine or perform database queries to determine if the requested call is to a private number, a long distance or international number, a local number, an emergency number, etc. In a preferred embodiment, this is performed using various tables which may be provided in the database 312, and by examination of the prefix digits of the called party phone number value. The MSCP 304 may also remove or add prefix or suffix digits to the called party phone number value. The result of any such prefix/suffix manipulation results in a revised called party phone number value. This revised number may then be used to determine a corresponding ATM address of the called party CPE.

The MSCP 304 may also, depending on the features and capabilities associated with one or more of the calling party phone number value, the ATM address of the calling party CPE, and the called party phone number value, consult a database or table of provisioned information to determine whether the called party phone number value should be translated to some other phone number and whether permission to make such a call is available. For example, the destination party may have forwarded their phone number to another phone number. In such a case, the MSCP 304 may determine that the called party phone number value should be translated to another called party phone number value. In such a case, the MSCP 304 may request whether the calling party has permission or sufficient rights to place a call to the translated or forwarded called party phone number.

As a result of the various manipulations and features and services provided by the MSCP 304, an output is provided to the ASIP 302. The ASIP 302 assembles or generates an output ATM setup message using the output from the MSCP 304. In a preferred embodiment, the resulting called party phone number value is stored in the called party subaddress parameter of the output ATM setup message, and the original calling party phone number value is stored in the calling party subaddress of the output ATM setup message. In addition, the output ATM setup message may include the ATM address of the calling party CPE stored in the calling party number parameter, and the calling party phone number value stored in the calling party subaddress. As an example, the following two tables illustrate various parameters and corresponding values or addresses of the input ATM setup message and the output ATM setup message.

| PARAMETERS | VALUE |
|---|---|
| INPUT ATM SETUP MESSAGE | |
| Called Party Number | VToA designator |
| Called Party Subaddress | called party phone number value |
| Calling Party Number | ATM address of the calling party CPE |
| Calling Party Subaddress | calling party phone number value |
| OUTPUT ATM SETUP MESSAGE | |
| Called Party Number | ATM address of the called party CPE Called |
| Party Subaddress | called party phone number value |
| Calling Party Number | ATM address of the calling party CPE |
| Calling Party Subaddress | calling party phone number value |

The ASIP 302 provides the output ATM setup message to the ATM network side of the ATM ingress edge switch where the output ATM setup message is provided to the ATM network and eventually delivered at the appropriate egress ATM edge switch to establish the SVC for VToA.

Figure 4:
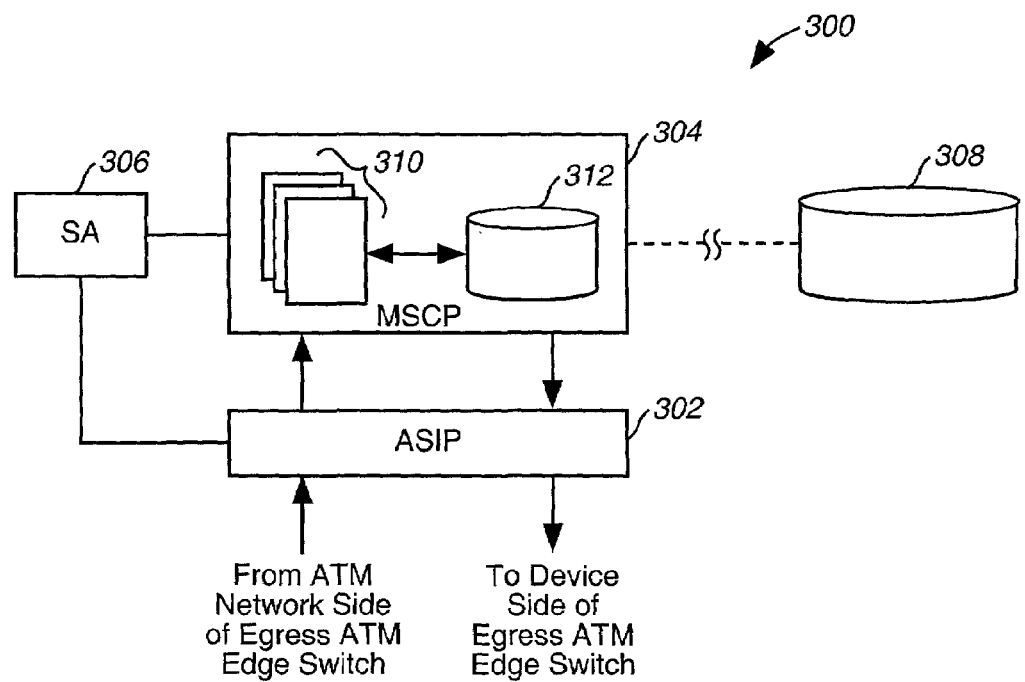
FIG. 4 is a block diagram that illustrates the intelligent network used at the egress side of the ATM network for providing VToA services using an ATM switched virtual circuit.

FIG. 4 is a block diagram that illustrates the intelligent network 300 used at the egress side of the ATM network, such as the ATM network 18 of FIG. 1, for providing VToA services and features using an ATM switched virtual circuit. Thus, in one embodiment of the present invention, the ASIP 302 and the MSCP 304 may provide intelligent network services and features to an ATM edge switch serving as an ingress ATM edge switch and an egress ATM edge switch, depending on how a VToA call is established.

When serving the associated ATM edge switch that is functioning as an egress switch, the intelligent network 300 receives the output ATM setup message from the ATM network. As mentioned above, the egress ATM edge switch may be considered part of the ATM network. The egress ATM edge switch provides the output ATM setup message to the ASIP 302.

The ASIP 302 intercepts the output ATM setup message from the egress ATM edge switch and generates or extracts an input to provide to the MSCP 304. This input may include any of a variety of values provided by the output ATM setup message. For example, the input may include the ATM address of the called party CPE.

At the egress side, the MSCP determines the appropriate port or CLP of the egress ATM edge switch in which to route the ATM setup message. The MSCP 304, however, may provide any of a variety of services and features, and may provide additional routing information.

In the event that the MSCP 304 generates an output such that the ASIP 302 assembles or generates an ATM setup message that is different from the output ATM setup message, this new ATM setup message may be referred to as a destination or gateway ATM setup message. In any event, the ASIP 302 provides the ATM setup message to the device side of the egress ATM edge switch so that the ATM setup message may be provided to the appropriate CPE. Of course, the CPE may be provided as any number of devices such as an enterprise gateway, a network gateway, or various other telephony equipment. The CPE will generally interpret the ATM setup message by looking at the called party phone number value stored, preferably, in the called party subaddress parameter of the ATM setup message to determine how to make the final connection to the appropriate telephony device.

Figure 5:
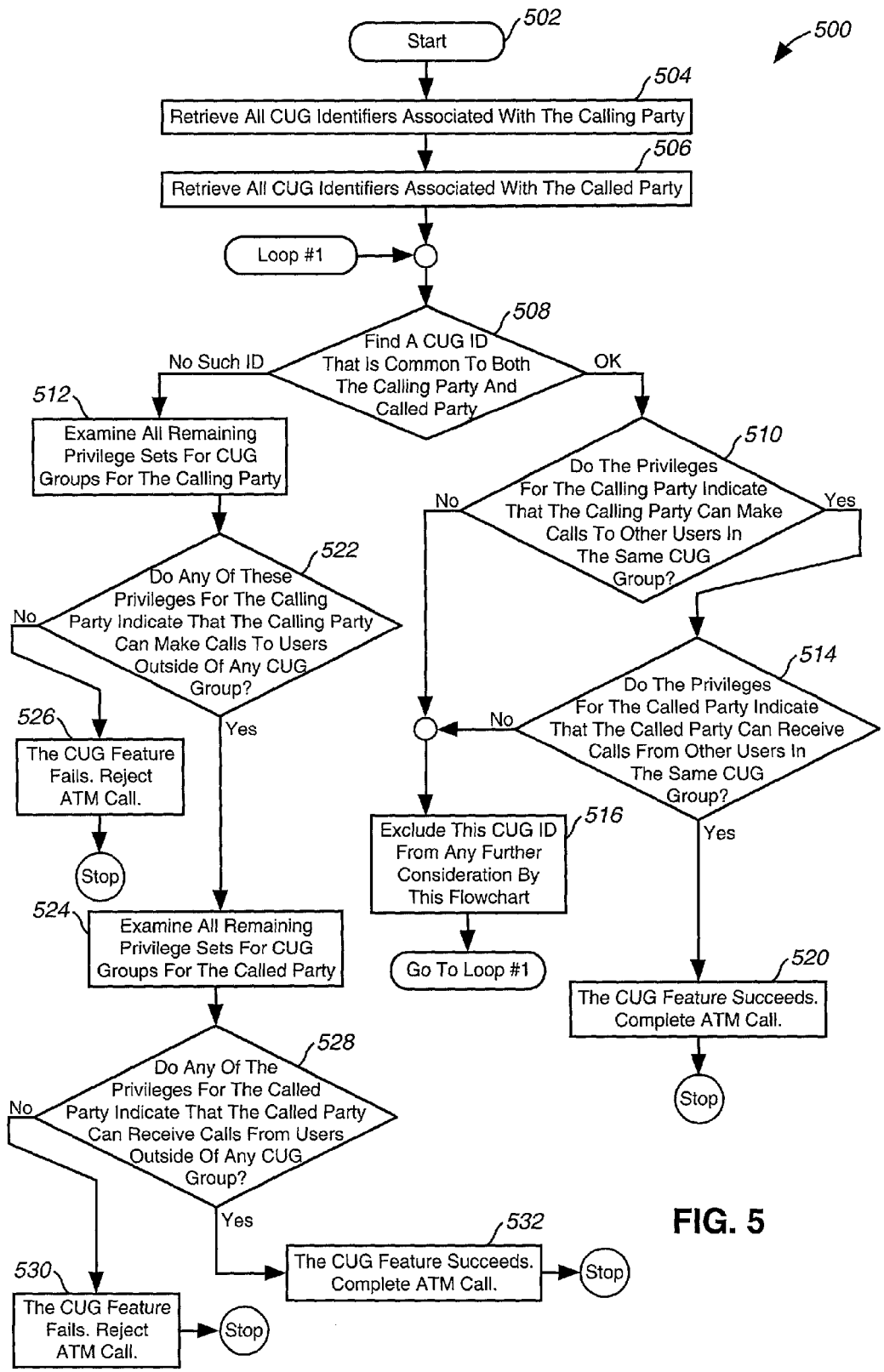
FIG. 5 is a flowchart that illustrates a method for providing a closed user group service to authorize VToA calls.

FIG. 5 is a flowchart that illustrates a method 500 for providing a closed user group service to authorize VToA calls using an intelligent network and a switched virtual circuit over an ATM network. Before discussing the method 500, various definitions will be provided regarding closed user groups. Closed user groups work by defining various users of an ATM network. The various users of the ATM network may be grouped into user groups. For example, a user group may be the engineering or marketing group of a business enterprise. Thus, the user group may be defined as a collection of users. Each user group may be identified by a user group identifier.

Figure 6:
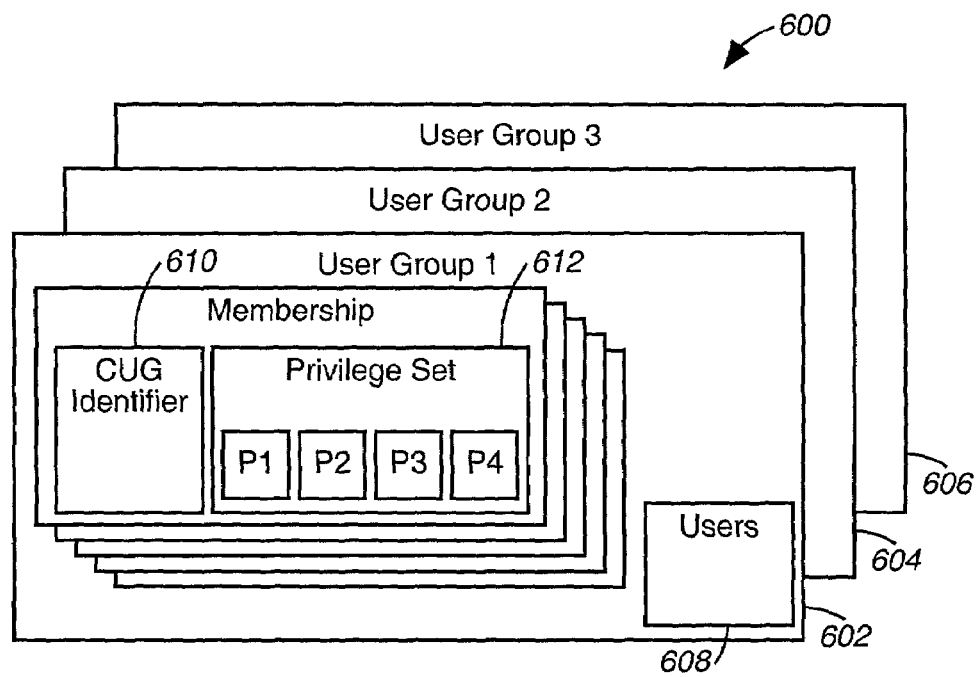
FIG. 6 is a view of a data structure from a user group perspective for defining closed user groups to authorize VToA calls.

A user group may be viewed or thought of as being a member of a closed user group. In a preferred embodiment, the number of memberships that a user group can have in various closed user groups is limited. For example, the number of memberships a user group may be limited to five memberships in different closed user groups. It should be understood, however, that this limit may be established at virtually any threshold or removed altogether. In such a view of a user group, each membership of a user group may be thought of as containing a set, pair, or combination of values such as a (i) closed user group identifier, and (ii) a privilege set, which is discussed more fully below. This view of a user group is shown in FIG. 6 and is discussed more fully below in connection therewith.

A user, according to one aspect of the present invention, may be a member of only one user group. A user group, however, may be a member of various closed user groups. As such, a user may be considered a member of or associated with various closed user groups through its user group's membership or association with such closed user groups.

A privilege set may be defined by a privilege value that represents a plurality of privileges. For example, in one embodiment, a privilege set is represented by a boolean value that corresponds to whether certain privileges are allowed or not. The table shown below in connection with the discussion of a decision block 510 of the method 500 provides an example of a privilege set that includes four privileges. A boolean value, such as a 1100 may correspond to the situation where the first and second privileges are indicated to be valid or set, while the third and fourth privileges are indicated not to be valid. In such a case, calls are allowed to other members of this closed user group, and calls are allowed from other members of this same closed user group. A user of this closed user group, however, is not allowed to make calls to users outside of the closed user group, or to receive calls from users outside of this closed user group. As is illustrated, a privilege set, in application, may, preferably, be associated with a user group and a closed user group. A privilege set, just like a user group and a closed user group, may have a numeric identifier.

Figure 7:
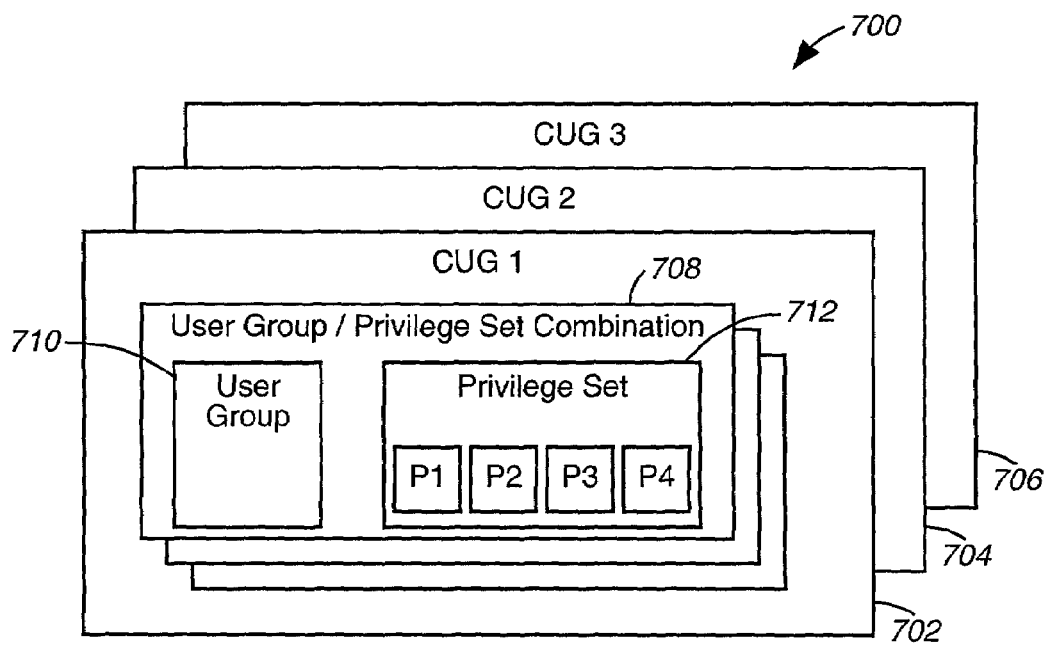
FIG. 7 is a view of a data structure from a closed user group perspective for defining closed user groups to authorize VToA calls.
Figure 8:
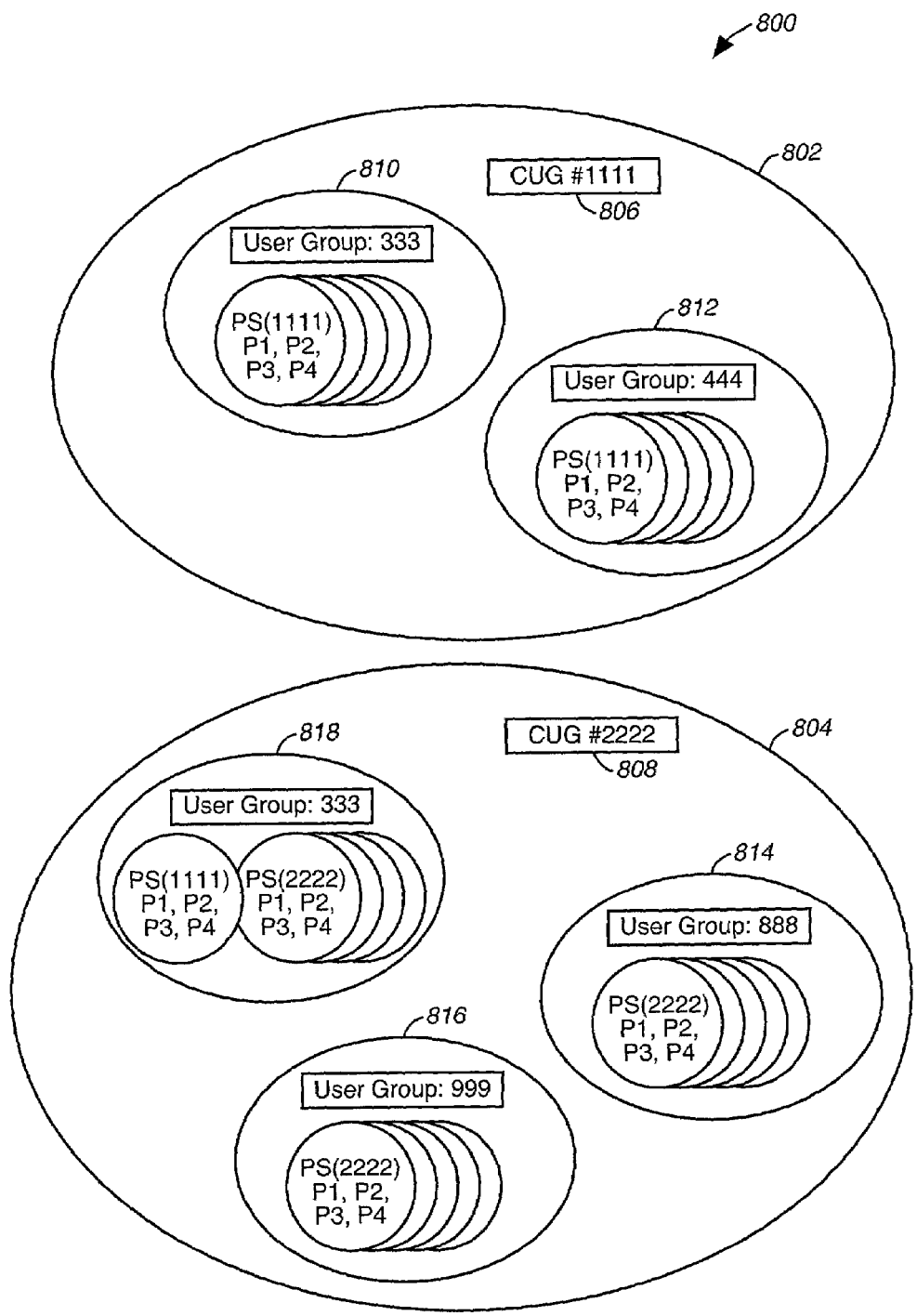
FIG. 8 is a view of a data structure from a closed user group perspective for defining closed user groups to authorize VToA calls, according to another aspect of the present invention.

A closed user group, however, may be associated with various user group/privilege set combinations or pairs. This is illustrated in FIG. 7 and FIG. 8 in a view of a data structure from a closed user group perspective for defining closed user groups to authorize VToA calls. Thus, it should be noted that it is possible for a user "X" and a user "Y" to each be associated with a different user group yet belong to or be a member of the same closed user group through each of their user group's association with the same closed user group. The association of each user group to the same closed user group are in connection with a different privilege set. As a consequence, two users may be associated with the same closed user group yet have different privileges.

In a preferred embodiment, the closed user group service to authorize VToA calls will be performed at the MSCP, similar to any of a variety of other services and features that the intelligent network of the present invention may enable. Thus, the present invention provides advanced closed user group functionality, without the need or requirement of an interlocking code, and without the arduous and extremely burdensome task of continuously updating various distributed databases, such as those that may be provided various gateways coupled to an ATM network.

Referring again to the flowchart of the method 500 for providing a closed user group service to authorize VToA calls, in a preferred embodiment this method is performed or achieved at an ingress MSCP. The method 500 begins at block 502 and proceeds to block 504. At block 504, an input ATM setup message is intercepted by an ASIP at an ingress ATM edge switch and certain information is extracted from the input ATM setup message and provided to the MSCP for analysis and closed user group service processing. All closed user group identifiers for the calling party, or calling user, are retrieved. This will preferably be achieved using a database at the MSCP or in communication with the MSCP. This may include, for example, the various closed user group identifiers in which the user group, in which the calling party is a member, is associated. Similarly, all of the privilege sets of such user group, and associated closed user groups, are known or readily available.

The method 500 proceeds next to block 506 where all of the closed user group identifiers associated with the called party are retrieved or are made readily available. Just as with the calling party, the called party will, generally, be a member of a user group. This user group will be associated with various closed user groups through an associated privilege set. Thus, various privilege sets and associated closed user group information is available for the called party. Of course, the information for the called party could have been retrieved before the information of the calling party.

Method 500 proceeds next to decision block 508 where a closed user group identifier that is common to both the calling party and the called party is found or located. This may be achieved in any number of ways such as, for example, determining a data set "A" that includes the closed user group numeric identifiers of the closed user groups associated with the calling party. Similarly, a data set "B" may be determined that includes the closed user group numeric identifiers of the closed user groups associated with the called party. Next, a data set "C" is generated based on the intersection of sets "A" and "B." The data set "C" will contain the closed user group identifiers of all closed user groups that the calling party and the called party share in common. These may be referred to as common closed user groups. As noted above, however, the calling party and the called party may have different privilege sets associated with each such closed user group.

Once a common closed user group is located, the method 500 proceeds to decision block 510. Otherwise, the calling party and the called party do not have any closed user groups in common and the method proceeds to block 512, which will be discussed more fully below.

At decision block 510, the privilege set of the calling party that is associated with the common closed user group that was found to be in common between the calling party and the called party is analyzed to determine if any privilege exists that would allow the calling party to make calls to other users in this particular closed user group that is shared in common.

| | PRIVILEGES |
|---|---|
| 1 | Calls are allowed to other members of this same closed user group. |
| 2 | Calls are allowed from other members of this same closed user group. |
| 3 | Calls are allowed to users outside of this closed user group. |
| 4 | Calls are allowed from users outside of this closed user group. |

For example, and referring to the table above, the first privilege indicates that calls may be allowed to other members of the same closed user group. Referring back to decision block 510, if this is the case, the method proceeds to decision block 514. Otherwise, the method 500 proceeds to block 516. At block 516, the current common closed user group is no longer considered and the method 500 returns to the decision block 508 to see if there is another common closed user group between the calling party and the called party. Otherwise, the method 500 proceeds to the decision block 514.

Decision block 514, which is similar to decision block 510, analyzes the privilege set, which translates into individual privileges, associated with the called party and the common closed user group at issue. If any of these privileges indicate that the called party may receive calls from other users of the common closed user group, the method 500 proceeds to block 520, otherwise, the method proceeds to block 516 as was just discussed above. At block 520, the closed user group service will authorize the setup of the VToA call because adequate closed user group privileges have been established.

Returning to decision block 508 of the method 500, the next common closed user group is located and the method proceeds as just discussed. At such point in time when the method 500 proceeds back to the decision block 508 and no additional common closed user groups exist between the calling party and the called party, the decision block 500 proceeds to block 512. At such block, all of the remaining privileges, as defined by the privilege set or sets of closed user groups associated with the calling party in which the called party is not a member, are examined. The method 500 proceeds next to decision block 522.

At decision block 522, the privileges examined in block 512 are analyzed to determine if any of these privileges provide the calling party with the authority or right to make calls to users outside of any closed user group. If so, the method proceeds to block 524, otherwise the method 500 proceeds to block 526 where the method 500 results in the closed user group service determining that the requested VToA call by the calling party should be rejected. The method 500 ceases after the block 526.

If the result of decision block 522 indicates that the calling party has the privilege or right to make calls outside of any closed user group, the method 500 proceeds to block 524. At block 524, similar to block 512, all remaining privileges provided by closed user groups that the called party is a member but the calling party is not a member are examined. The method 500 proceeds next to decision block 528.

At decision block 528, it is determined whether the called party has the right, from any of the privileges examined in the block 524, to receive calls from outside of any closed user group. If not, the method proceeds to block 530, which is similar to block 526, and the method 500 results in the closed user group service rejecting the requested ATM call through the input ATM setup message initiated by the calling party. The method 500 then ceases at the block 530.

If it is determined at decision block 528 that the called party can receive calls from outside any closed user group, the method 500 proceeds to block 532 where the closed user group service indicates that the ATM call can be made. The method 500 then ceases.

FIG. 6 is a view of a data structure 600 from a user group perspective for defining closed user groups to authorize VToA calls. The data structure 600 includes a first user group 602, a second user group 604, and a third user group 606. Of course, any number of user groups may be provided or defined.

As is illustrated by the first user group 602, each user group may contain (or be associated with) various users, as illustrated by the block 608 within the first user group 602, and may have various relationships or associations with various closed user groups. These relationships or associations may be defined as memberships.

As shown in the first user group 602, a membership may be defined or viewed to include a closed user group identifier and an associated privilege set. The closed user group identifier is shown at 610, and the privilege set is shown at 612. The privilege set 612 includes privileges P1, P2, P3, and P4. Thus, a user that is a member of a user group will also be a member or associated with each such closed user group identified in the various memberships of the user group.

The view of the data structure 600 of FIG. 6 illustrates one view of the association between users, user groups, closed user groups, and privilege sets.

FIG. 7 is a view of a data structure 700 from a closed user group perspective for defining closed user groups to authorize VToA calls. The data structure 700 is shown with a first closed user group 702, a second closed user group, 704, and a third closed user group 706.

Focusing now on the first closed user group 702, various user group/privilege set combinations are illustrated in association with the closed user group 702. For example, a user group/privilege set combination 708 is shown with a user group 710 and a privilege set 712. The user group 710 may be identified by a user group identifier value or indicator and will be associated with one or more users that are members of the user group 710. The privilege set 712, just as was shown in FIG. 6, will include any of a variety of privileges, such as the four privileges shown in the privilege set 712. The privilege set 712 may be represented by a privilege value, such as a boolean or binary value, that provides the status of the various underlying privileges.

The view of the data structure 700 of FIG. 7 illustrates another view of the association between users, user groups, closed user groups, and privilege sets.

FIG. 8 is a view of data structure 800 from a closed user group perspective for defining closed user groups to authorize VToA calls, according to another aspect of the present invention. As shown, the data structure 800 is similar to the data structure 700 of FIG. 7, except that the various user groups are shown with various other underlying privileges that are used in association with other closed user group identifiers.

A closed user group 802 and a closed user group 804 are shown with closed user group identifiers. The closed user group 802, which includes a closed user group identifier 1111, and a closed user group 804, which includes a closed user group identifier 2222, are shown with various user group/privilege set combinations, similar to FIG. 7 except that additional user group/privilege set combinations are represented by the additional privilege sets, such as additional privilege sets 820. The closed user group 802 is shown with a user group/privilege set combination 810, and a user group/privilege set combination 812. The closed user group 804 is shown with a user group/privilege set combination 814, a user group/privilege set combination 816, and a user group/privilege set combination 818.

It is interesting to note that the user group/privilege set combination 810 is provided with a user group 333 and a privilege set associated with the closed user group 802 through the closed user group identifier 1111 as illustrated, while that same user group 333 is provided as part of the user group/privilege set combination 818 of the closed user group 804. The associated privilege set of the user group/privilege set combination 818 is shown with the same closed user identifier as the closed user group 802. This illustrates the concept that a user group may be associated with more than one closed user group through a different or another privilege set.

Thus, it is apparent that there has been provided, in accordance with the present invention, an intelligent network and method for providing VToA and closed user groups that provide improved performance and that satisfies one or more of the advantages set forth above. The present invention provides advanced intelligent network services and features that dramatically increase the attractiveness of using VToA by providing the advanced services and features, with little administrative burden or expense to maintain. Although the preferred embodiment has been described in detail, it should be understood that various changes, substitutions, and alterations can be made herein without departing from the scope of the present invention, even if all of the advantages identified above are not present. For example, although the focus herein is primarily on VToA and closed user groups, however, application to other packet-switched telecommunications technologies, both individually and collectively, may apply also to any of the technologies mentioned above or similar technologies. Also, the techniques, systems, sub-systems, and methods described and illustrated in the preferred embodiment as discrete or separate may be combined or integrated with other systems, modules, techniques, or methods without departing from the scope of the present invention. For example, the ATM signaling intercept processor and the multi-service control point may be implemented separately or together, or may by directly coupled to each other or could be coupled through some other interface and are not considered directly coupled to each other but may still be in communication with one another. Other examples of changes, substitutions, and alterations are readily ascertainable by one skilled in the art and could be made without departing from the spirit and scope of the present invention.

What is claimed is:

1. An intelligent network for use with an ATM network to set up an ATM switched virtual circuit to provide voice telephony over ATM services and closed user group services, the intelligent network comprising:
   a multi-service control point operable to receive an input extracted from an input ATM setup message that includes a called party phone number value and a voice telephony over ATM designator, execute a closed user group service to determine whether to authorize a voice telephony over ATM call between a calling party and a called party, and generate an output in response for use in generating an output ATM setup message;
   an ATM signaling intercept processor operable to intercept the input ATM setup message from an ingress ATM edge switch of the ATM network, extract the input from the input ATM setup message, communicate the input to the multi-service control point, receive the output generated by the multi-service control point, generate the output ATM setup message using the output, and communicate the output ATM setup message to the ingress ATM edge switch of the ATM network; and
   a service administration operable to provision the multi-service control point and the ATM signaling intercept processor.

2. The intelligent network of claim 1, wherein the multi-service control point, in order to execute the closed user group service, is operable to perform the following:
   determine closed user group identifiers for the calling party,
   determine closed user group identifiers for the called party, locate a common closed user group identifier that is common to the calling party and the called party,
   analyze privileges of the calling party in the common closed user group to determine if the calling party can make calls to other users of the common closed user group, and
   analyze privileges of the called party in the common closed user group to determine if the called party can receive calls from other users of the common closed user group, and wherein a voice telephony over ATM call between the calling party and the called party is completed if a common closed user group identifier is located, the calling party has privileges to call other users of the common closed user group, and the called party has privileges to receive calls from other users of the common closed user group.

3. The intelligent network of claim 2, wherein the multi-service control point, in order to execute the closed user group service, is operable to further perform the following:
   examine all remaining privileges for all privilege sets of closed user groups in which the calling party is a member and the called party is not a member to determine if the calling party can make calls to other users outside of a closed user group, and
   examine all remaining privileges for all privilege sets of closed user groups in which the called party is a member and the calling party is not a member to determine if the called party can receive calls from other users outside of a closed user group, and wherein a voice telephony over ATM call between the calling party and the called party is completed if the calling party can make calls to other users outside of a closed user group, and the called party can receive calls from other users outside of a closed user group.

4. The intelligent network of claim 1, wherein the input includes a calling party phone number value.

5. The intelligent network claim 3, wherein the called party phone number value is stored in a called party subaddress parameter of the input ATM setup message, the voice telephony over ATM designator is stored in a called party number parameter of the input ATM setup message, the calling party phone number value is stored in a calling party subaddress parameter of the input ATM setup message, and the ATM address of the customer premises equipment of the calling party is stored in a calling party number parameter of the input ATM setup message.

6. The intelligent network of claim 1, wherein the multi-service control point determines if the input ATM setup message requests a switched virtual circuit for voice telephony over ATM by analyzing the voice telephony over ATM designator portion of the input.

7. The intelligent network of claim 1, wherein the multi-service control point further includes:
   a database that correlates the called party phone number value with an ATM address of customer premises equipment of the called party, and wherein the multi-service control point includes the ATM address of the customer premises equipment of the called party in the output.

8. The intelligent network of claim 1, wherein the multi-service control point includes various applications operable to provide the voice telephony over ATM services through analyzing the input to generate the output.

9. A method for providing voice telephony over ATM and closed user group services using an intelligent network and a switched virtual circuit over an ATM network, the method comprising:
   intercepting an input ATM setup message from an ingress ATM edge switch of the ATM network;
   extracting information from the input ATM setup message;
   analyzing the information to determine if the input ATM setup message is a request to set up a switched virtual circuit for voice telephony over ATM;
   executing a closed user group service to determine whether to authorize a VToA call between a calling party and a called party;
   determining an ATM address of customer premises equipment of the called party;
   generating an output ATM setup message that includes the ATM address of the customer premises equipment of the called party; and
   communicating the output ATM setup message to the ingress ATM edge switch of the ATM network.

10. The method of claim 9, wherein executing a closed user group service to determine whether to authorize a voice telephony over ATM call between the calling party and the called party further includes:
- determining closed user group identifiers for the calling party;
- determining closed user group identifiers for the called party;
- locating a common closed user group identifier that is common to the calling party and the called party;
- analyzing privileges of the calling party in the common closed user group to determine if the calling party can make calls to other users of the common closed user group; and
- analyzing privileges of the called party in the common closed user group to determine if the called party can receive calls from other users of the common closed user group, and wherein a voice telephony over ATM call between the calling party and the called party is completed if a common closed user group identifier is located, the calling party has privileges to call other users of the common closed user group, and the called party has privileges to receive calls from other users of the common closed user group.

11. The method of claim 10, wherein executing a closed user group service to determine whether to authorize a voice telephony over ATM call between the calling party and the called party further includes:
- examining all remaining privileges for all privilege sets of closed user groups in which the calling party is a member and the called party is not a member to determine if the calling party can make calls to other users outside of a closed user group; and
- examining all remaining privileges for all privilege sets of closed user groups in which the called party is a member and the calling party is not a member to determine if the called party can receive calls from other users outside of a closed user group, and wherein the voice telephony over ATM call between the calling party and the called party is completed if the calling party can make calls to other users outside of a closed user group, and the called party can receive calls from other users outside of a closed user group.

12. A method for providing a closed user group service to authorize voice telephony over ATM calls using an intelligent network and a switched virtual circuit over an ATM network, the method comprising:
- intercepting an input ATM setup message from an ingress ATM edge switch of the ATM network
- extracting information from the input ATM setup message:
- determining closed user group identifiers for a calling party;
- determining closed user group identifiers for a called party;
- locating a common closed user group identifier that is common to the calling party and the called party;
- analyzing privileges of the calling party in the common closed user group to determine if the calling party can make calls to other users of the common closed user group;
- analyzing privileges of the called party in the common closed user group to determine if the called party can receive calls from other users of the common closed user group, and wherein a voice telephony over ATM call between the calling party and the called party is completed if a common closed user group identifier is located, the calling party has privileges to call other users of the common closed user group, and the called party has privileges to receive calls from other users of the common closed user group;
- generating an output ATM setup message that includes an ATM address of customer premises equipment of the called party when the voice telephony over ATM call between the calling party and the called party is to be completed; and
- communicating the output ATM setup message to the ingress ATM edge switch of the ATM network.

13. The method of claim 12, wherein the calling party does not have privileges to call other users of the common closed user group, the method further comprising:
- locating another common closed user group identifier that is common to the calling party and the called party and proceeding to analyzing the privileges of the calling party.

14. The method of claim 12, wherein the called party does not have privileges to receive calls from other users of the common closed user group, the method further comprising:
- locating another common closed user group identifier that is common to the calling party and the called party and proceeding to analyzing the privileges of the calling party.

15. The method of claim 12, wherein when a common closed user group identifier cannot be located that is common to the calling party and the called party, the method further comprising:
- examining all remaining privileges for all privilege sets of closed user groups in which the calling party is a member and the called party is not a member to determine if the calling party can make calls to other users outside of a closed user group; and
- examining all remaining privileges for all privilege sets of closed user groups in which the called party is a member and the calling party is not a member to determine if the called party can receive calls from other users outside of a closed user group, and wherein a voice telephony over ATM call between the calling party and the called party is completed if the calling party can make calls to other users outside of a closed user group, and the called party can receive calls from other users outside of a closed user group.

16. The method of claim 15, wherein a voice telephony over ATM call fails if the calling party does not have privileges to make calls to other users outside of a closed user group.

17. The method of claim 15, wherein a voice telephony over ATM call fails if the called party does not have privileges to receive calls from other users outside of a closed user group.

18. The method of claim 12, wherein the ATM network does not provide an interlocking code.

19. An intelligent network for use with an ATM network for providing voice telephony over ATM and closed user group services via an ATM network, the intelligent network comprising:
- an ATM signaling intercept processor; and
- a multi-service control point configured to:
  - receive information extracted from an input ATM setup message,
  - analyze the information to determine whether the input ATM setup message is a request for a switched virtual circuit for a voice telephony call over ATM, execute a closed user group service to determine whether to authorize the voice telephony call over ATM between a calling party and a called party, determine an ATM address of customer premises equipment of the called party, generate an output message that includes the ATM address of the customer premises equipment of the called party when the voice telephony over ATM call between the calling party and the called party is to be completed, and communicate the output message to the ATM signaling intercept processor, the ATM signaling intercept processor is configured to:

intercept the input ATM setup message from an ingress ATM edge switch, extract the information from the input ATM setup message, communicate the extracted information to the multi-service control point, receive the output message from the multi-service control point, generate an output ATM setup message that includes the ATM address of the customer premises equipment of the called party, and communicate the output ATM setup message to the ingress ATM edge switch.

20. The intelligent network of claim 19, wherein when the multi-service control point executes the closed user group service to determine whether to authorize a voice telephony over ATM call between the calling party and the called party, the multi-service control point is further configured to:

determine closed user group identifiers for the calling party, determine closed user group identifiers for the called party, locate a common closed user group identifier that is common to the calling party and the called party, analyze privileges of the calling party in the common closed user group to determine if the calling party can make calls to other users of the common closed user group, and analyze privileges of the called party in the common closed user group to determine if the called party can receive calls from other users of the common closed user group.

21. The intelligent network of claim 20, wherein when the multi-service control point executes the closed user group service, the multi-service control point is further configured to:

examine all remaining privileges for all privilege sets of closed user groups in which the calling party is a member and the called party is not a member to determine if the calling party can make calls to other users outside of a closed user group, and examine all remaining privileges for all privilege sets of closed user groups in which the called party is a member and the calling party is not a member to determine if the called party can receive calls from other users outside of a closed user group, and wherein the voice telephony over ATM call between the calling party and the called party is completed if the calling party can make calls to other users outside of a closed user group, and the called party can receive calls from other users outside of a closed user group.

* * * * *